United States Patent [19]
Venkataraman et al.

[11] Patent Number: 5,821,273
[45] Date of Patent: Oct. 13, 1998

[54] EXTRUSION FOAMING OF FLUOROPOLYMERS

[75] Inventors: Sundar Kilnagar Venkataraman, Vienna, W. Va.; Charles Winfield Stewart, Newark; Maurice Armand Baumann, Wilmington, both of Del.

[73] Assignee: E. I. du Pont de Nemours and Company, Wilmington, Del.

[21] Appl. No.: 854,201

[22] Filed: May 9, 1997

Related U.S. Application Data

[60] Provisional application No. 60/018,092 May 22, 1996.

[51] Int. Cl.[6] ...................................................... C08J 9/08
[52] U.S. Cl. .............................. 521/79; 521/97; 521/145; 264/50; 264/53
[58] Field of Search ................................. 521/97, 145, 79

[56] References Cited

U.S. PATENT DOCUMENTS

| | | | |
|---|---|---|---|
| 3,006,029 | 10/1961 | Saxton | 18/12 |
| 3,072,583 | 1/1963 | Randa | 260/2.5 |
| 3,975,473 | 8/1976 | Mulvaney | 264/23 |
| 4,394,460 | 7/1983 | Chung et al. | 521/92 |
| 4,711,811 | 12/1987 | Randa | 428/383 |
| 4,716,073 | 12/1987 | Randa | 428/215 |
| 4,764,538 | 8/1988 | Buckmaster et al. | 521/89 |
| 5,023,279 | 6/1991 | Buckmaster et al. | 521/93 |
| 5,158,986 | 10/1992 | Cha et al. | 521/82 |
| 5,160,674 | 11/1992 | Colton et al. | 264/50 |
| 5,610,203 | 3/1997 | Buckmaster et al. | 521/85 |

*Primary Examiner*—Morton Foelak

[57] ABSTRACT

Fluoropolymer resin is extrusion foamed at low temperature using carbon dioxide as the foaming agent.

4 Claims, No Drawings

EXTRUSION FOAMING OF FLUOROPOLYMERS

CROSS-REFERENCE TO RELATED APPLICATION

This application claims the benefit of U.S. Provisional Application No. 60/018,092 filed May 22, 1996.

FIELD OF THE INVENTION

This invention is in the field of melt-fabricable fluoropolymers, specifically relating to the foaming of such resins during fabrication.

BACKGROUND OF THE INVENTION

U.S. Pat. No. 5,158,986 discloses the foaming of polymer plastic material, naming polyvinyl chloride, polyethylene terphthalate, high and low density polyethylene, and polycarbonate. The foaming is carried out by forming a supercritical fluid/polymer solution, either within an extruder or downstream from the extruder. In either case, the polymer is first fabricated into its desired shape, then this desired shape is foamed, i.e., post-fabrication foaming. Thus, the polymer is extruded in the foam of a sheet into a chamber wherein the sheet is maintained as such by passing through a series of rolls. Downstream from the rolls, the sheet is foamed. U.S. Pat. No. 5,160,674 discloses injection molding wherein a molded article is first formed under pressure to prevent foaming, followed by reducing the temperature of the article to cause nucleation of foam cells and then reducing pressure of the mold, to permit the article to foam. In this patent the polymers disclosed are are polyethylene and polypropylene, and the gaseous blowing agents that can be used are air, noble gases, nitrogen, or carbon dioxide. This patent also discloses extrusion shaping of the fabricated article, wherein the gas is diffused into the polymer in a diffusion chamber situated between the extruder and the shaping die or within the extruder itself.

Foaming of melt-fabricable fluoropolymer resins, usually by an extrusion process, has also been carried out as illustrated by U.S. Pat. Nos. 3,072,583; 4,394,460; 4,764,538; 5,023,279; and 5,610,203. For additional examples, see also U.S. Pat. Nos. 4,711,811 and 4,716,073. The '538 and '279 patents mention carbon dioxide among several gases that can be used in a continuous gas injection process. Both patents state that chlorodifluoromethane (HCFC-22) is especially suited for foaming fluoropolymer resins, and HCFC-22 and nitrogen are the only injected gas blowing agents exemplified. In the examples, resin melt temperatures are about 80°–120° C. above the melting point of the perfluorinated polymers and about 40°–75° C. above the melting point of the fluoropolymers that are ethylene copolymers. These are normal melt temperatures for extrusion of these resins. See, for example, "Extrusion Guide for Melt-Processible Fluoropolymers" (DuPont, 1993).

Extrusion foaming of fluoropolymer resin, i.e., simultaneous extrusion and foaming, has had the disadvantage of fluoropolymer requiring high extrusion temperatures, because of the high melting temperatures of such resins, with the extrusion temperature being at least 40° C. and as much as 120° C. higher than the melting temperature, so that the resin will have sufficient fluidity to be foamable. At such high extrusion temperatures, the resin is subject to some degradation which can manifest itself as discoloration or falling off of physical, chemical, or electrical properties. This is a particular problem with copolymers of ethylene and chlorotrifluoroethylene. Extusion foaming of fluoropolymer resins which does not have this problem is desired.

SUMMARY OF THE INVENTION

This invention is a process for extrusion foaming of melt-fabricable fluoropolymer resin, in which the foaming (blowing) agent is carbon dioxide and the temperature of the fluoropolymer resin is in a range below the normal melt temperature for extrusion of the resin. For perfluorinated polymer, the temperature of the resin at the extrusion die is from about 60° C. above the melting temperature of the fluoropolymer in the absence of carbon dioxide to a temperature below such melting point of the resin. For hydrogen-containing fluoropolymer, the temperature range is from about 35° C. above to a temperature below the melting point in the absence of carbon dioxide. Preferably, the carbon dioxide is injected into the extrusion process at a pressure that is at least the critical pressure, so that the carbon dioxide is in a supercritical state.

DETAILED DESCRIPTION OF THE INVENTION

As used herein, "extrusion foaming" includes not only the common process in which a foamed fluoropolymer shape is formed by extruding under pressure a fluoropolymer resin containing dissolved $CO_2$ through a shaping die into an unrestricted region at atmospheric pressure where the $CO_2$ expands to foam the resin, but also processes in which the resin/$CO_2$ under pressure is extruded into a bounded region at low pressure, usually atmospheric pressure, wherein the pressure on the $CO_2$ is reduced and the foaming fluoropolymer expands to fill the bounded region. One such process is injection molding of foamed articles.

The extrusion foaming process of this invention can be carried out by techniques known in the art, except for the use of $CO_2$ as foaming agent and for the relatively low extrusion temperature. Such foaming processes are described in the prior art. See, for example, U.S. Pat. Nos. 4,764,538 and 5,023,279. Such techniques commonly employ injection of the foaming agent into the extruder barrel. Either high-pressure or low-pressure $CO_2$ injection can be employed. If $CO_2$ is injected at low pressure, the pressure generally increases as resin and $CO_2$ traverse the extruder to the die, especially at lower temperature. It is preferred that the pressure at the die is at least the critical pressure of $CO_2$, which is about 1070 psig (7.48 MPa). Under this condition the $CO_2$ is in a supercritical state, since the critical temperature for $CO_2$ is relatively low at about 31° C. and $T_m$ for fluoropolymers is relatively high. As one skilled in the art will recognize, the pressure at the die is a function of several variables including the extruder, the die, the extrusion rate, the fluoropolymer resin, the temperature, and the amount of $CO_2$. Preferably, $CO_2$ is injected at a pressure that is at least the critical pressure so that $CO_2$ is supercritical from the point of intection to the die.

In the process of this invention, the temperature (T) of the resin (containing $CO_2$) at the extrusion die is lower than the temperature at which the fluoropolymer resin is normally extruded, or extrusion foamed. This resin temperature is generally in the range of from about 40° C. below to about 35° C. above the melting temperature ($T_m$) of the fluoropolymer resin in the absence of carbon dioxide, except that for perfluoropolymer resins T can be as much as 60° C., preferably no more than 40° C. or 50° C., above $T_m$. Preferably, T is no more than 20° C. below $T_m$. For all fluoropolymers, T can be no more than 30° C., preferably no more than 20° C., above $T_m$.

The fluoropolymer resins useful in the present invention include all such resins that can be foamed by a gas injection process. More specifically, the fluoropolymer resins useful in the present invention are organic polymeric compounds containing at least 35 wt % fluorine and are melt fabricable. As such, they generally have a melt flow rate (MFR) of about 1–100 g/10 min as measured according to ASTM D-1238 at the temperature appropriate to each resin. Preferred MFR is in the range 5–25 g/10 min.

Preferred examples of such fluoropolymers are:

(a) homopolymers of chlorotrifluoroethylene (CTFE), 2,2-difluoroethylene, or vinylidene fluoride, or (b) copolymers of tetrafluoroethylene (TFE) and one of the monomers in (a), or (c) copolymers of at least one of the monomers in (a) or (b) and one or more monomers selected from the group consisting of ethylene (E), terminally unsaturated perfluoroolefins having 3–8 carbon atoms, perfluoro(alkyl vinyl ethers) (PAVE) having 3–8 carbon atoms, perfluoro(alkoxy alkyl vinyl ether) having 5–12 carbon atoms, and perfluoroalkyl ethylene having 3–8 carbon atoms.

Especially preferred fluoropolymers are the perfluorinated copolymers TFE/hexafluoropropylene, optionally including one or more additional monomers; and TFE and at least one perfluoro(alkyl vinyl ether) selected from perfluoro(methyl vinyl ether), perfluoro(ethyl vinyl ether), and perfluoro(propyl vinyl ether); and the hydrogen-containing copolymers E/TFE including E/TFE/perfluorobutyl ethylene; E/CTFE; and polyvinylidene fluoride.

Preferably, the fluoropolymer resin used in the extrusion foaming process of this invention contains a foam cell nucleating agent. Such nucleating agents are disclosed, for example, in U.S. Pat. Nos. 3,072,583; 4,764,538; and 5,023,279.

As well known to those skilled in the art, foaming results vary with equipment, extrusion conditions, and foaming method as well as with resin, nucleating agent, and nucleating agent concentration. Thus, results obtained in one test or set of tests may not be directly comparable with the results of another test or set of tests.

EXAMPLES

In these examples the foaming process was a continuous injection foaming process carried out using an Entwistle 1.25-inch (31.8-mm) extruder having length/diameter ratio of 30/1 and using carbon dioxide as the blowing agent unless otherwise noted.

Void fraction was calculated from the measured density of foamed extrudate, using 2.15 as the specific gravity of the fluoropolymer resin. Average foam cell size was determined at mid-wall of the foamed extrudate by taking a photograph of a thin section of the foam at 40–150× magnification and measuring cell size on the photograph.

Examples 1–4

In these examples the extruder was equipped with a decompression screw having a low-pressure zone. Carbon dioxide was injected into this zone at low pressure, with pressure generally increasing as resin and $CO_2$ were pumped along the extruder barrel to the die. Industrial grade cylinder (800 psig, 5.6 MPa) $CO_2$ was used, with pressure controlled by the regulator on the cylinder. Extruder screw design allowed for the gas injection and had a mixing torpedo (U.S. Pat. No. 3,006,029) to provide a uniform melt. Details of the extrusion conditions are given in Table 1.

Example 1 was a tubing extrusion with no automatic windup, the extrudate simply dropping into a water quench about 2 ft (0.6 m) below the die. Examples 2–4 were carried out using a die having 90 individual orifices, each 0.031 inch (0.79 mm) in diameter, distributed in a 4 inch by 0.2 inch (102 mm by 5 mm) array. With this die, the individual beadings foamed upon exiting the orifices and merged to form a rough slab having no gross space between the beadings. This slab was led away from the die with a puller, narrowing to a width of about 3 inch (76 mm), and was cooled in air.

The fluoropolymer resin (PFA) used in Examples 1–2 was a copolymer of tetrafluoroethylene (TFE) and perfluoro (propyl vinyl ether) (PPVE) having a nominal melting temperature of 302°–310° C. by DSC (Teflon® PFA fluoropolymer resin grade 340, DuPont). A foam nucleating agent system was introduced as a concentrate of boron nitride (BN), calcium tetraborate (CaTB), and the barium salt of a mixture of perfluoroalkyl ethane sulfonic acids (BaS-10, CAS No. IC3-56-0) in the same type of resin. The concentrations of nucleating agent constituents in the extrudate, i.e., after combining with the natural resin, are given in Table 1.

The fluoropolymer resin (FEP) used in Examples 3–4 was a copolymer of tetrafluoroethylene and hexafluoropropylene, ASTM D-2116 Type I (Teflon® FEP fluoropolymer resin grade 100, DuPont). Typical melting point for this resin is 264° C. The nucleating agent constituents and their concentrations are also given in Table 1.

These PFA and FEP resins are conventionally extruded at melt temperatures in the range 370°–400° C. Nevertheless, the Examples show that good foams can be obtained at lower melt temperatures.

TABLE 1

Extrusion Detail for Examples 1–4

|  | Example: | | | |
| --- | --- | --- | --- | --- |
|  | 1 | 2 | 3 | 4 |
| Resin & nucleating agent | | | | |
| Resin type | PFA | PFA | FEP | FEP |
| BN (wt %) | 0.25 | 0.25 | 0.25 | 0.25 |
| CaTB (ppm) | 110 | 110 | 120 | 120 |
| BaS-10 (ppm) | 180 | 180 | — | — |
| Extruder | | | | |
| Die type | tubing | slab | slab | slab |
| Die diameter (mm) | 3.26 | — | — | — |
| Guide tip diameter (mm) | 1.91 | — | — | — |
| Temperatures (°C.) | | | | |
| Rear | 343 | 343 | 334 | 307 |
| Center rear | 343 | 363 | 348 | 324 |
| Center | 344 | 363 | 347 | 329 |
| Center front | 344 | 363 | 347 | 323 |
| Front | 318 | 352 | 332 | 308 |
| Clamp | 316 | 329 | 305 | 283 |
| Adapter | 307 | 316 | 295 | 272 |
| Crosshead | 277 | 316 | 309 | 279 |
| Die | 278 | — | — | — |
| Melt (In extrusion die) | 287 | 323 | 304 | 278 |
| Running conditions | | | | |
| Screw speed (rpm) | 21 | 80 | 80 | 80 |
| $CO_2$ injection pressure (MPa) | 2.86 | 2.17 | 2.17 | 2.17 |
| Crosshead pressure (MPa) | 7.69 | 3.21 | 5.90 | 8.93 |
| Air gap to water quench (m) | ~0.6 | — | — | — |

TABLE 1-continued

Extrusion Detail for Examples 1–4

| | Example: | | | |
|---|---|---|---|---|
| | 1 | 2 | 3 | 4 |
| Extrudate properties | | | | |
| Outside diameter (mm) | 3.68 | — | — | — |
| Wall thickness (mm) | 0.06 | — | — | — |
| Ave. foam cell size ($\mu$m) | ~25 | 40–60 | 75–100 | — |
| Voids (%) | 39 | 48 | — | — |

Examples 5–10 and Comparisons A–B

For Examples 5–9 and for Comparison A, the procedures of Example 1 were essentially followed, except that the die diameter was 4.57 mm, an extruder screw designed for high pressure gas injection (no decompression zone) was used, two orifices designated A and B normally used for high-pressure (see U.S. Pat. No. 3,975,473) gas injection were used to test different gas flow rates, the length of the air gap to the water quench was approximately 0.3 m, $CO_2$ from a cylinder source was compressed to higher pressure using a gas booster (Model AGT-32/62, Haskel International) so that injection pressures were above the critical pressure, and the operating conditions were as listed in Table 2. Comparison B differed from the foregoing in that high pressure cylinder nitrogen was used instead of $CO_2$. For Example 10, the procedures of Example 2 (slab die) were essentially followed except for the screw and $CO_2$ delivery changes noted above and the operating conditions as listed in Table 2. Properties of the foamed extrudates, also listed in Table 2, show that good foams can be obtained at low melt temperatures. As shown by Example 9 and Comparison B, run under the same conditions except for the blowing agent, $CO_2$ gave increased foaming as indicated by the dimensions and higher void fraction, even though nitrogen is also supercritical under the conditions employed.

TABLE 2

Extrusion Detail for Examples 5–10 and Comparisons A–B

| | Example: | | | | | | | |
|---|---|---|---|---|---|---|---|---|
| | A | 5 | 6 | 7 | 8 | 9 | B | 10 |
| Extruder | | | | | | | | |
| Die type | tubing | tubing | tubing | tubing | tubing | tubing | tubing | slab |
| Orifice | A | A | A | A | B | B | B | B |
| Temperatures (°C.) | | | | | | | | |
| Rear | 358 | 336 | 335 | 335 | 343 | 343 | 343 | 343 |
| Center rear | 372 | 343 | 343 | 343 | 343 | 363 | 343 | 344 |
| Center | 372 | 343 | 343 | 343 | 343 | 343 | 343 | 344 |
| Center front | 372 | 343 | 343 | 343 | 329 | 329 | 329 | 344 |
| Front | 372 | 343 | 343 | 343 | 316 | 316 | 316 | 329 |
| Clamp | 372 | 343 | 343 | 302 | 302 | 302 | 302 | 303 |
| Adapter | 372 | 343 | 329 | 302 | 302 | 302 | 302 | 301 |
| Crosshead | 344 | 316 | 302 | 288 | 302 | 302 | 302 | 285 |
| Die | 344 | 316 | 302 | 302 | 302 | 316 | 316 | — |
| Melt (In extrusion die) | 386 | 357 | 347 | 337 | 334 | 333 | 333 | 303 |
| Running conditions | | | | | | | | |
| Screw speed (rpm) | 55 | 55 | 55 | 55 | 95 | 71 | 71 | 70 |
| $CO_2$ injection pressure (MPa) | 17.9 | 17.9 | 17.9 | 23.5 | 20.7 | 20.7 | — | 27.6 |
| $N_2$ injection pressure (MPa) | — | — | — | — | — | — | 20.7 | — |
| Barrel pressure (MPa) | 11.0 | 10.3 | 12.7 | 18.6 | 12.6 | 13.1 | 13.1 | 9.9 |
| Crosshead pressure (MPa) | 13.4 | 12.8 | 16.6 | 22.8 | 13.5 | 12.6 | 12.8 | 7.9 |
| Extrudate properties | | | | | | | | |
| Outside diameter (mm) | 5.33 | 5.33 | 5.33 | 6.10 | 4.83 | 6.86 | 5.08 | — |
| Wall thickness (mm) | 1.71 | 1.77 | 1.82 | 2.09 | 1.40 | 1.59 | 1.38 | — |
| Ave. foam cell size ($\mu$m) | 150 | 220 | 275 | 275 | 35 | 80 | 40 | 200 |
| Voids (%) | 64 | 55 | 49 | 49 | 44 | 73 | 63 | 41 |

What is claimed is:

1. In the process of extrusion foaming of melt-fabricable fluoropolymer resin, the improvement comprising carrying out said foaming wherein carbon dioxide is used as the foaming agent and the temperature of said fluoropolymer resin is from about 60° C. above the melting temperature of said fluoropolymer resin in the absence of carbon dioxide to a temperature below such melting point of said resin, provided that when said fluoropolymer is hydrogen-containing fluoropolymer said temperature is no more than about 35° C. above said melting point.

2. The process of claim 1, wherein said fluoropolymer is perfluoropolymer and said temperature is no more than 50° C. above said melting point.

3. The process of claim 1, wherein said temperature is no more than 30° C. above said melting point.

4. In the process of claim 1 wherein said resin is perfluorinated.

* * * * *